(12) United States Patent
Smedley et al.

(10) Patent No.: US 6,253,200 B1
(45) Date of Patent: *Jun. 26, 2001

(54) STRUCTURED QUERY LANGUAGE TO IMS TRANSACTION MAPPER

(75) Inventors: Richard Ray Smedley, Broken Arrow; Guy Robert Laroche, Tulsa; Michael Raymond Clapper, Broken Arrow, all of OK (US)

(73) Assignee: Sabre Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/982,333

(22) Filed: Dec. 2, 1997

Related U.S. Application Data

(63) Continuation of application No. 08/730,487, filed on Oct. 11, 1996, now Pat. No. 5,761,494.

(51) Int. Cl.[7] .................... G06F 9/00; G06F 17/30
(52) U.S. Cl. ..................... 707/4; 707/2; 709/328
(58) Field of Search ................ 707/4, 2; 709/302, 709/328

(56) References Cited

U.S. PATENT DOCUMENTS

| | | | |
|---|---|---|---|
| 4,205,371 | * 5/1980 | Feather | 707/101 |
| 4,930,071 | * 5/1990 | Tov et al. | 707/4 |
| 4,956,774 | * 9/1990 | Shibamiya | 707/2 |
| 5,412,806 | * 5/1995 | Du et al. | 707/2 |
| 5,423,022 | * 6/1995 | Ackley | 395/500 |
| 5,432,930 | * 7/1995 | Song | 707/4 |
| 5,442,779 | * 8/1995 | Barber et al. | 707/4 |
| 5,504,885 | * 4/1996 | Alashqur | 395/705 |
| 5,511,186 | * 4/1996 | Carhart et al. | 707/2 |
| 5,528,759 | * 6/1996 | Moore | 395/200.54 |
| 5,530,852 | * 6/1996 | Meske, Jr. et al. | 395/200.36 |
| 5,546,570 | * 8/1996 | McPherson et al. | 707/4 |
| 5,564,050 | * 10/1996 | Barber et al. | 707/4 |
| 5,761,494 | * 6/1998 | Smedley et al. | 707/4 |

\* cited by examiner

*Primary Examiner*—Paul V. Kulik
(74) *Attorney, Agent, or Firm*—Finnegan, Henderson, Farabow, Garrett & Dunner, L.L.P.

(57) ABSTRACT

A process to access an IMS transaction based computer system from a structured query language (SQL) application program without revising or migrating the transaction based system. Binary virtual table mappings are built. An SQL statement from the SQL application program is parsed. Virtual column to transaction utilization mappings are extracted from the SQL statement. A possible solution set or solution sets are generated which may be capable of satisfying the SQL statement. Thereafter, transaction costs for each potential solution set are determined. Finally, a solution set with the lowest cost to satisfy the SQL statement is executed.

14 Claims, 3 Drawing Sheets

STRUCTURED QUERY LANGUAGE TO IMS TRANSACTION MAPPER

This application is a continuation of U.S. patent application Ser. No. 08/730,487, filed Oct. 11, 1996, now U.S. Pat. No. 5,761,494, issued Jun. 2, 1998, the content of which is relied upon and incorporated herein by reference.

BACKGROUND OF THE INVENTION

1. Field of the Invention

The present invention is directed to a middleware tool to allow access to information management system (IMS) transaction based computer systems from a structured query language (SQL) application program. In particular, the present invention is directed to a system wherein the SQL application can be used to communicate and operate with IMS transaction based systems without revising or migrating the transaction based system.

2. Prior Art

Relational databases have been used extensively over the past few years. Relational databases store all data in tables. In a relational system, tables have horizontal rows and vertical columns (sometimes referred to as files, records and fields, respectively) A set of related tables forms a database. The tables in a relational database are separate but equal with no hierarchial ranking of tables.

More recently, relational databases have standardized on a language called structured query language (SQL), which first appeared in the mid-70's. SQL employs a set of commands in a declarative language which specifies which data is to be accessed. SQL statements consist of four basic verbs: insert, delete, update and select. SQL is set theory oriented and is a complete data language which supports data definition, data control, and transaction management. SQL has become the standard language of networked database servers.

Open database connectivity (ODBC) is becoming a defacto standard for Windows™ platform client applications. ODBC defines an application programmer interface (API) for access to multiple database management systems.

Databases that organize the data into an hierarchy are called hierarchical systems. IMS transaction-based systems often employ such systems in mainframe environments. The IMS database system comprises tree structured entities from which logical data files are defined. Each class of data is located at different levels along a particular branch that stems from the root. Under the IMS database system, there is often more than one method to retrieve any one piece of data.

Another trend is the migration from mainframe computer systems to PC based client/server systems. Migration requires an expensive translation which may take years to accomplish.

Accordingly, it would be desirable to provide an interface between a mainframe transaction based system and the SQL ODBC application. Heretofore, it has not been possible to map a non- mainframe SQL request with a mainframe based IMS transaction using client-based middleware. It is desirable for both a client ODBC application in SQL language and a mainframe IMS transaction-based system to communicate and operate with each other.

It is also desirable not to alter the IMS transaction based system for a number of reasons. Typically, a great amount of investment has been made to the IMS transaction based systems. Additionally, there is a level of reliability and security with existing IMS based systems. The layers of protection built into the mainframe system programs control the input and output of the databases. Accordingly, it would be advantageous to provide a system that will communicate and interact with an IMS transaction based system without revising or migrating the IMS transaction based system.

Thus, it would be advisable to use the mainframe transaction based system as a server for the client SQL applications.

Presently, there are a number of approaches available that will provide access from an ODBC client application to mainframe based databases. Screen scrapers will allow for custom client applications to be written that will access mainframe system screens directly by mapping client access variables directly to screen row and screen column positions. These tools do not allow a client application to issue SQL statements to satisfy application queries. Rather, they are dependent on direct mappings to data contained in the mainframe screens. Consequently, client side application development is restricted since the screen scraping middle layer cannot translate SQL statements to mainframe transactions.

Direct database access tools will allow client applications to access mainframe databases directly using SQL statements. The direct database access tools do not allow access to the often vast base of existing transaction based mainframe systems. Although the client application has direct access to the mainframe database using SQL, it must re-implement business rules needed to interface to that database.

By way of example, Song (U.S. Pat. No. 5,432,930) discloses a system to access COBOL data files with an SQL database language by creating dictionaries for each COBOL data file and assigning attributes to them. Song, however, uses CCSQL (COBOL SQL) which is a native COBOL language different from ODBC SQL and embeds CCSQL (COBOL SQL) statements in the COBOL. Song does not allow one to translate an ODBC request to retrieve data from the mainframe IMS transaction based system using existing mainframe programs.

Feather (U.S. Pat. No. 4,205,371) provides a method for executing a first system request in a second system environment. Feather, however, requires conversion of database files from one environment to the other.

Accordingly, it is a principal object and purpose of the present invention to provide access to information management system (IMS) transaction based computer systems from a structured query language (SQL) application without revising or migrating the transaction based system.

It is an additional object and purpose of the present invention to provide an ODBC to APPC interface to access IMS transactions.

It is an additional object and purpose of the present invention to provide an ODBC to APPC interface to access IMS transactions that evaluates the efficiency of access paths in order to decide which path would be the most efficient.

SUMMARY OF THE INVENTION

The present invention provides a process and a system to access an IMS transaction based computer system from a structured query language (SQL) application program.

An SQL statement would be entered by a user through a computer utilizing an ODBC software application program. The SQL statement will be delivered to an ODBC driver manager. The driver manager is a self-contained software module designed to provide software services to the ODBC application program.

The ODBC driver manager is in communication with an SQL mapper engine through an ODBC interface. The SQL statement will be parsed to determine how the SQL statement can be satisfied by executing one or more mainframe transactions. The statement will be checked for syntactical and semantical correctness and for its lexicon.

The mapper engine will read a binary file containing virtual table and column mappings to determine a virtual database scheme. The mappings are built by an analyst or analysts in advance to define virtual tables and columns representing a logical view of and path to the hierarchical or relational database of the IMS system.

The mapper engine translates the SQL statement into possible transaction execution sets using the binary mappings file. The mapper engine reads the mappings and determines, using a non- deterministic algorithm, that a transaction based solution exists for a given SQL statement issued by the application program.

The mapper engine may determine that a particular combination of transactions can satisfy the SQL statement requests. Costs are computed for each of the solution series. Various factors are considered in the cost computation, including (1) the number of different transactions in the series; (2) an "extra cost" figure associated with each transaction; (3) the number of times each transaction will be executed; (4) the operation being performed by the transaction; and (5) the number of records expected to be returned from invocation of each inquiry.

Thereafter, a lowest cost transaction set is chosen and executed via a transaction data stream through a virtual circuit communications interface to an APPC server.

Finally, the APPC server is in communication with and provides an APPC transaction data stream to a mainframe transaction based system which may include hierarchical databases. As the host mainframe responds, APPC transaction data streams are passed back to the APPC server. The APPC server, in turn, sends transaction data streams back to the mapper engine, and thereafter back to the ODBC application.

DETAILED DESCRIPTION OF THE PREFERRED EMBODIMENTS

Figure 1:
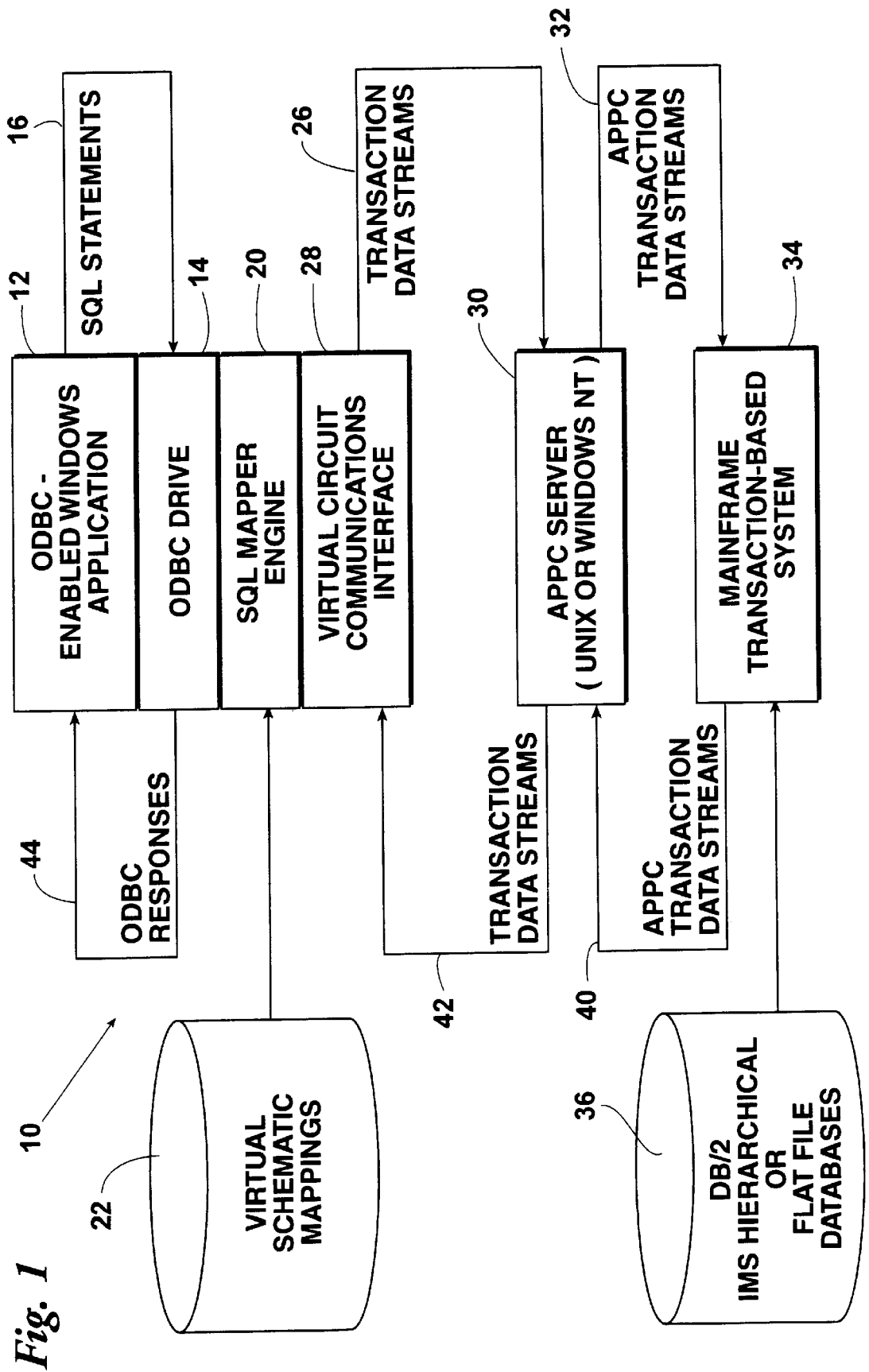
FIG. 1 is a simplified schematic diagram of one preferred example of the process and system to access IMS transaction based computer system from an SQL application.

Referring to the drawings in detail, FIG. 1 illustrates a simplified schematic diagram of one preferred example of the process and system 10 to access an IMS transaction based computer system from a structured query language (SQL application) as set forth in the present invention. It will be understood that other arrangements (including CICS-based systems) may be employed within the spirit of the invention.

An open database (ODBC) compatible software application program which employs structured query language (SQL) is shown in block 12. Examples of such an application program include Visual Basic™, Microsoft Excel™, and Power Builder™. The application program 12 would operate with a computer CPU (not shown) connected to a display and a keyboard used for input of instructions. The computer would typically include a read only memory (ROM), a random access memory (RAM) and a hard drive for long term storage of files. One example of such a client side system would be a 486 CPU with Microsoft Windows™ operating system.

The ODBC application program or tool 12 will issue an SQL statement entered by a user (not shown) to an ODBC driver manager 14. The driver manager 14 is a self-contained software module designed to provide software services to the ODBC application program 12. One example of such a driver manager 14 is that provided by Microsoft™.

The SQL statement issued is indicated by arrow 16. The SQL statement will be in the form of text lines entered by the user. The basic SQL statements "SELECT", "UPDATE", "INSERT", and "DELETE" are considered.

The ODBC driver 14 is in communication with an SQL mapper engine 20 which will map client application generated SQL statements to potential IMS transaction solution sets. The driver 14 will be in communication with the mapper engine 20 through an ODBC interface.

The SQL statement 16 will be parsed to determine how the SQL statement can be satisfied by executing one or more mainframe transactions. During this process, the SQL statement will be checked for syntactical and semantical correctness and for its lexicon.

The mapper engine 20 will read a binary file containing virtual table and column mappings to determine a virtual database scheme. The mappings are built by an analyst or analysts in advance and are illustrated in the database shown at 22. The virtual table mappings 22 allow an analyst to define virtual tables and columns representing a logical view of the hierarchical database. Thus, transaction streams from the IMS transaction based computer system are described as references to the virtual table mappings.

The mappings file 22 stores IMS transaction names and the associated data references they will access in the IMS database. In one embodiment, an analyst could use a utility program (not shown) to build the virtual database definitions.

A definition for each column in each table is built. For example, a path would be constructed for one column in one table to map to the IMS database.

The mapper engine 20 reads these mappings and determines, using a non-deterministic algorithm, if a transaction based solution exists for a given SQL statement issued by the user through the application program 12.

The mapper engine 20, thus, translates SQL statements into possible transaction execution sets using the binary mappings files 22.

After a particular transaction set is chosen, communication is made with the mainframe system. In the present example, an industry standard Advanced Program-to-Program Communication (APPC) is used. The transaction set is executed via an APPC conversation data stream 26 through virtual circuit communications interface 28 with various protocol and communications options including transmission control protocol/internet communication protocol (TCP/IP) and dial-up communications.

An APPC server 30 is a LAN-aware server which supplies APPC services to the mapper engine 20. An equivalent request in APPC/IMS format is, thus, created.

The APPC server 30 is, in turn, in communication with and provides an APPC transaction data stream 32 to a mainframe transaction based system 34. The mainframe system 34 is either an IMS or CICS transaction based environment which includes stored hierarchical or relational databases 36.

The mainframe system 34, thus, receives a request in its native language.

Information provided by the IMS mainframe will thereafter be retrieved. As the host mainframe system 34 responds, APPC transaction data streams 40 are passed back to the APPC server 30. The APPC server 30, in turn, sends transaction data streams 42 back to the mapper engine 20 which processes it before returning an ODBC response back to the application 12, as indicated by arrow 44.

FIGS. 2, 3, 4 and 5 illustrate the process by which the present invention operates and shows in detail the operation of the mapper engine 20.

Figure 2:
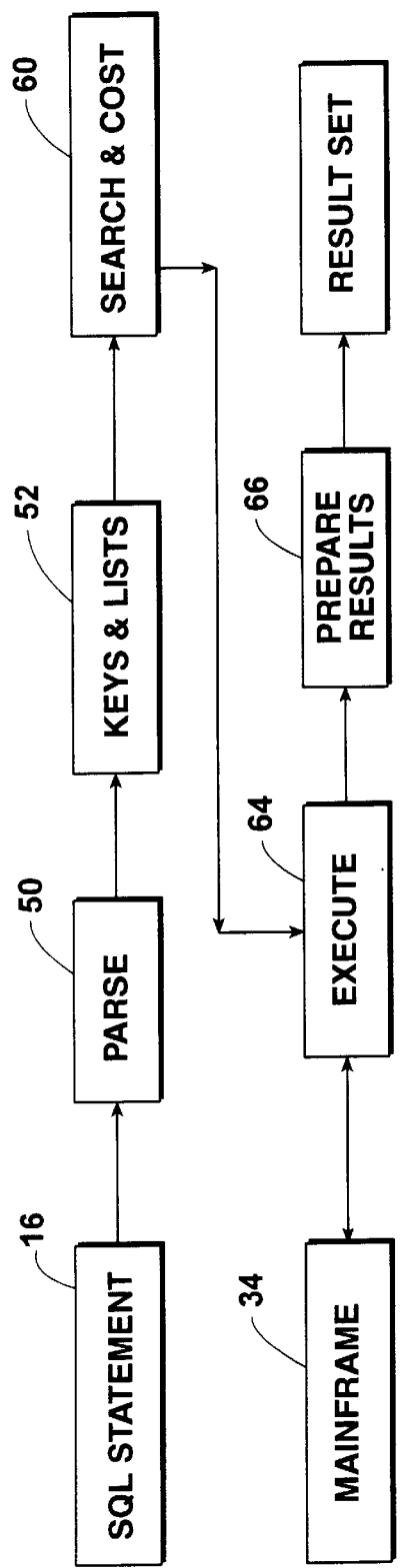
FIGS. 2, 3, 4 and 5 illustrate schematic diagrams of the various aspects of the process and system to access an IMS transaction based computer system from an SQL application as shown in FIG. 1.

FIG. 2 illustrates the processing of the SQL statement 16. An SQL statement 16 is sent via a Windows™ based application 12. The SQL statement 16 is parsed as shown at 50. Not only is the syntax checked, the SQL statement components are analyzed to determine certain "key" constructs as shown in 52. A key is unique qualifier provided in the SQL statement.

Figure 3:
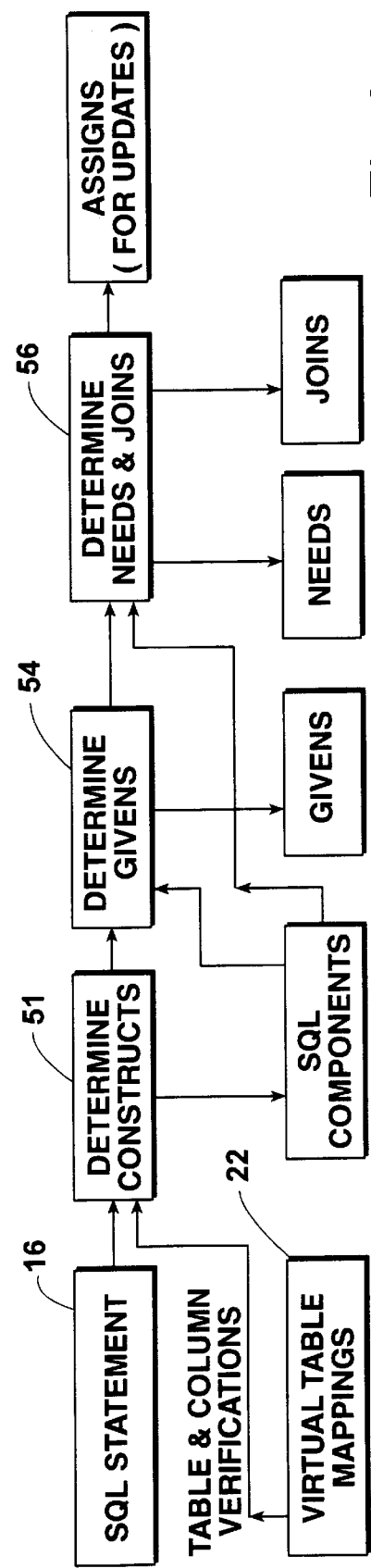
Figure 4:
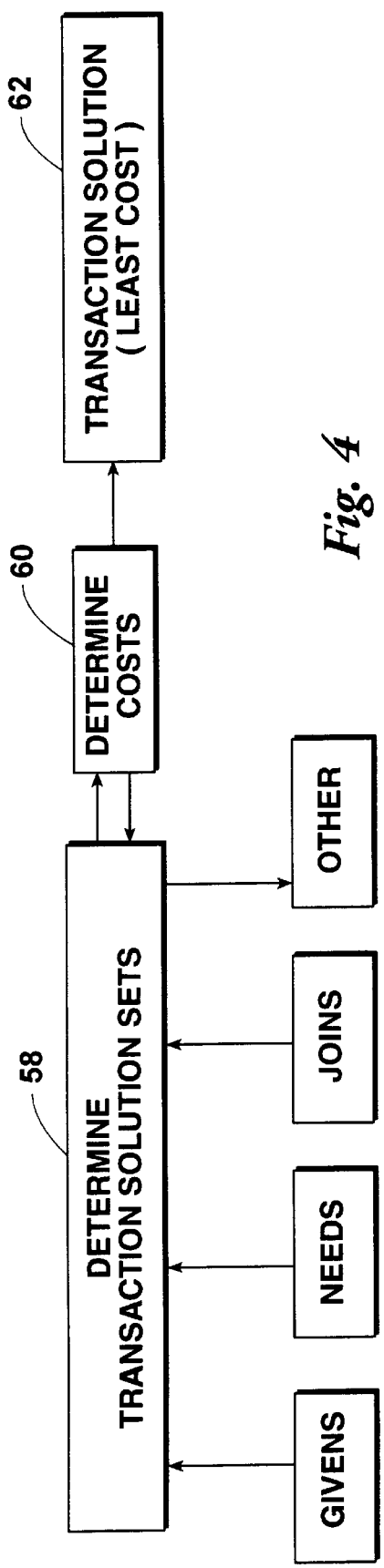

FIGS. 3 and 4 illustrate the process sequentially. FIG. 3 illustrates a detailed flow chart of the parsing 50 and keys and lists 52 steps. The "determine constructs" step is illustrated at box 51. The SQL statement 16 is decomposed into a series of tokens. Each word, comma, parenthesis, etc., is represented by an internal format. Embedded comments and "whitespace" (space character, tab character, newline character, etc.) are not tokenized. Unrecognized or unsupported items within the SQL statement result in a "syntax error" (For additional information regarding the ODBC Structured Query Language (SQL) syntax, please refer to the *Microsoft® ODBC 2.0 Programmer's Reference and SDK Guide* Microsoft Press, 1994).

Next, the set of tokens is processed for its semantic interpretation. Column and table names are identified and validated against the column and table names stored in the SQLMapper Binary. Unqualified column names (e.g.: column names not qualified with a table name) are qualified using the table names given in the SQL statement. "Inserted" values are matched with their respective columns.

Finally, recursive constructs are built which represent the utilization of each semantic clause. For example, the WHERE clause becomes a singular construct consisting of a series of data comparison, conversion and logic constructs. Each logic construct may itself contain multiple comparison and other logic constructs. Each data reference may consist of conversion and function constructs.

When complete, a single construct will represent each of the SQL semantic clauses, including: SELECT, FROM, WHERE, VALUES, GROUP, BY, HAVING or ORDER BY.

Certain parameters may be given in the SQL statement as shown at box 54. The Determine Givens logic provides for the application of logic rules to the WHERE or VALUES constructs. The WHERE or VALUES constructs identify the specific columns and their values which are applicable to their complete construct. The AND logic construct adds qualifications while the OR logic construct causes the removal of qualifications when the columns conflict. For example:

WHERE A=1 AND (B=2 OR B=3) results in only column A with a value of 1.

WHERE A=1 or A=2 results in column A with values of 1 and 2.

The application of these types of rules is processed using the hierarchy of constructs which represents the data qualifications. Consideration is also given to other comparison operations, such as LESS THAN (<), GREATER THAN OR EQUAL TO (>=), NOT EQUAL (A=) etc.

For Example:

WHERE A=1 OR A<3 AND A>0 results in A with a range from 0 to 3.

Additionally, certain parameters may yet be necessary to complete the request as shown at 56. Identification of columns whose values must be:

1. retrieved 2. changed 3. linked to columns of other tables (join)

For a SELECT statement, all referenced columns are applied to the need list. For an UPDATE statement, the columns to be changed are found in the SET clauses and the needed columns are in its WHERE clause. The semantics of SQL statement dictates such considerations.

Join operations are identified by a comparison construct in the WHERE clause which references columns from two tables as an equality.

For example, given the following SQL statement:

UPDATE TBL SET A=3 WHERE B=6 AND C=7 the following is derived:

|  | Column |
|---|---|
| NEED | B, C |
| CHANGE | A |

Returning to a consideration of FIG. 1, the mapper engine 20 will review and pull information from the virtual mappings database 22. At various stages during its method search process, the mapper engine 20 may determine that a number of particular transactions can satisfy the SQL statement request. Often, there will be more than one way to retrieve a piece of data. The present invention will determine the most efficient.

As illustrated at box 60, at this point, a cost is computed for the solution series.

The factors which are considered in the cost computation are:

1. The number of different transactions in the series.

2. The "Extra Cost" figure associated with each transaction.

3. The number of times each transaction will be executed.

4. The operation being performed by the transaction. (Inquiry, Update, Delete, Insert).

5. The number of records expected to be returned from the invocation of each Inquiry.

An important objective is to minimize the number of transactions which must be run by the host. The size of the response from each transaction is also considered since this involves communication time for the information to be transmitted back to the client.

The cost is computed using information about each transaction within the series. The cost calculation over a series is as follows:

$$\text{Cost} \stackrel{\Sigma}{=} [TranCount + ExtraCost + (ResultRecs/50)]$$

For Update and Delete operations, the TranCount for that particular transact ion is first multiplied by 2. This is because one invocation will be needed for an inquiry to seed the fields which are not otherwise provided. The second execution of the transaction will then perform the intended action.

The value of 50 which is divided into the ResultRecs is configurable. This is an acknowledgment that large data streams have a cost in the transmission of that data, and this cost is less than the cost of running a transaction on the host.

The ExtraCost factor is optional. It is specified when the mapping definition is built, and may be associated with the utilization (operation) of any transaction. A different value may be used for any Inquiry, Update, Delete, or Insert utilization of each transaction. This feature is used to skew the cost away from certain transactions which are be deemed to be expensive within the host.

Example Description:

This example is typical of a transaction series. It may have been generated to satisfy an SQL statement such as the following:

UPDATE Emp_Hist SET EmpInfo=3 WHERE EmpDpt IN ('A', 'B', 'C') AND EmpClass='X'

The first transaction (TRN1) is retrieving information using the EmpDpt as the primary key. It will be used once for each of the three values of the IN() clause. It may be retrieving employee ID numbers for each employee in the various departments.

The second (TRN2) is retrieving additional information which is needed for the upgrade operation and which was not returned by the TRN1. Or, it may be further qualifying each employee to determine which of those have an EmpClass value of 'X'.

The third (TRN3) is performing the actual update operation. For each employee an Inquiry using the transaction will precede the Update operation.

Cost Calculation:

| Series | Tran Name | Est # Times | Oper | Extra Cost | # Recs Each | Total # Recs |
|---|---|---|---|---|---|---|
| 1 | TRN1 | 3 | Inq | 0 | 10 | 30 |
| 2 | TRN2 | 30 | Inq | 1 | 1 | 30 |
| 3 | TRN3 | 30 | Upd | 0 | 1 | 30 |

TranCount : 93    ( TRN1 = 3 + TRN2 = 30 + (TRN3 = 30 * 2) )
ExtraCost : 30    ( TRN2 = 1 * 30Times )
RsltRecs : 90    ( TRN1 = 30 + TRN2 = 30 + TRN3 = 30 )
Cost = 124    ( 93 + 30 + (90 / 50) )

Runtime Variance:

The actual cost at execution time may vary from the calculated cost. This is either because of the estimated #records variance for a specific data request or because of the filtering which occurs for each record received.

At binary creation time, TRN1 is estimated to return 10 records (an average) for each transaction. For any particular value given to it, the transaction may in fact return either more or less.

The second transaction will be executed for as many records as are returned from the first. The results of this would be then filtered to exclude records which do not contain the qualification of EmpClass='X'. Even if 30 records are processed at this step in the series, perhaps only 20 will fulfill the filtering and be executed in the third transaction of the series.

Runtime Minimization:

If the information represents the employee history, it may be possible that the same employee has been in multiple departments. Without further qualification, it is conceivable that the same employee will be returned from the execution of TRN1 for EmpDpt value of 'A' and 'B'.

This would then lead to the TRN2 and TRN3 being generated for the same employee multiple times. For this reason, transaction cost minimization extends into the runtime engine. When two or more identical transactions would be executed for the same information, only one invocation will actually be used. The results of this are then applied to all duplicates.

This runtime minimization can only yield a lower actual cost than the calculated estimate.

FIG. 4 continues the process described in FIG. 3 and illustrates a detailed flow chart of the search 58 and cost steps 60. The givens, needs and joins are each considered to determine all of the possible transaction solutions.

Figure 5:
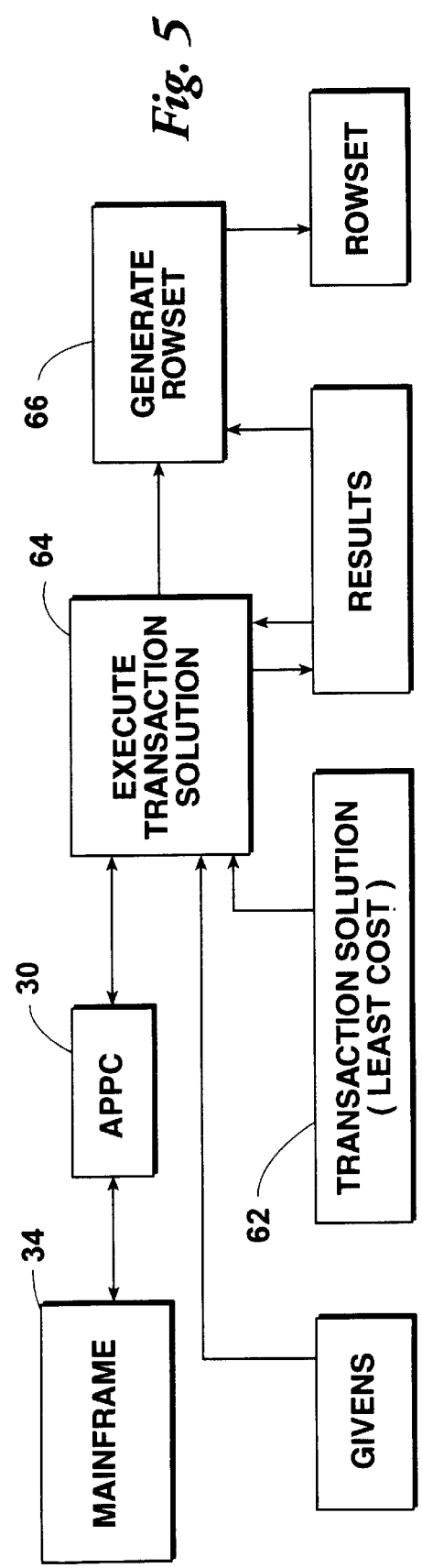

As best seen in FIG. 5, once the lowest cost transaction solution 62 is determined, the other possible solutions are discarded and the lowest cost transaction solution 62 is executed, as shown at 64.

The transaction set is executed via an APPC conversation data stream to an APPC server 30 which creates an equivalent request in APPC/IMS format. The APPC server 30 is in communication with the mainframe transaction based system 34.

When the IMS transaction responds, it responds in IMS native language. Box 66 represents the preparation of results and generation of the rowset.

An ODBC response is directed back to the application.

Whereas, the present invention has been described in relation to the drawings attached hereto, it should be understood that other and further modifications, apart from those shown or suggested herein, may be made within the spirit and scope of this invention.

What is claimed is:

1. A method for accessing a transaction based computer system having transaction streams from a structured query language (SQL) application, the method comprising:

building a table with references to the transaction streams;

parsing an SQL statement from said SQL application;

extracting column to transaction utilization mappings from said SQL statement; and generating transactions capable of satisfying said SQL statement based on the extracted column to transaction utilization mappings.

2. The method of claim 1, further comprising:

executing the transactions of the solution set.

3. The method of claim 1, wherein said structured query language application is open database compatible (ODBC).

4. The method of claim 1, further comprising:

storing said table in a file.

5. The method of claim 1, wherein the generating step includes:

determining a transaction cost for each of the transactions.

6. The method of claim 1, wherein the parsing step includes:

analyzing said statement for its lexicon and syntax.

7. The method of claim 1, further including:

communicating between said SQL application and a transaction-based system with APPC.

8. An apparatus for accessing a transaction based computer system having transaction streams from a structured query language (SQL) application, the apparatus comprising:

a building component configured to build a table with references to the transaction streams;

a parser configured to parse an SQL statement from said SQL application;

an extractor configured to extract column to transaction utilization mappings from said SQL statement; and a generator configured to generate transactions capable of satisfying said SQL statement based on the extracted column to transaction utilization mappings.

9. The apparatus of claim 8, further comprising:

a processor configured to execute the transactions of the solution set.

10. The apparatus of claim 8, wherein said structured query language application is open database connectivity compliant (ODBC).

11. The apparatus of claim 8, further comprising:

a storage configured to store said table.

12. The apparatus of claim 8, wherein the generator includes:

a component configured to determine a transaction cost for each transaction.

13. The apparatus of claim 8, wherein the parser includes:

a component configured to analyze said statement for its lexicon and syntax.

14. The apparatus of claim 8, further including:

a component configured to communicate between said SQL application and a transaction-based system with APPC.

* * * * *